Feb. 26, 1952     T. NERMAN     2,587,511
TRIPOD
Filed July 22, 1949
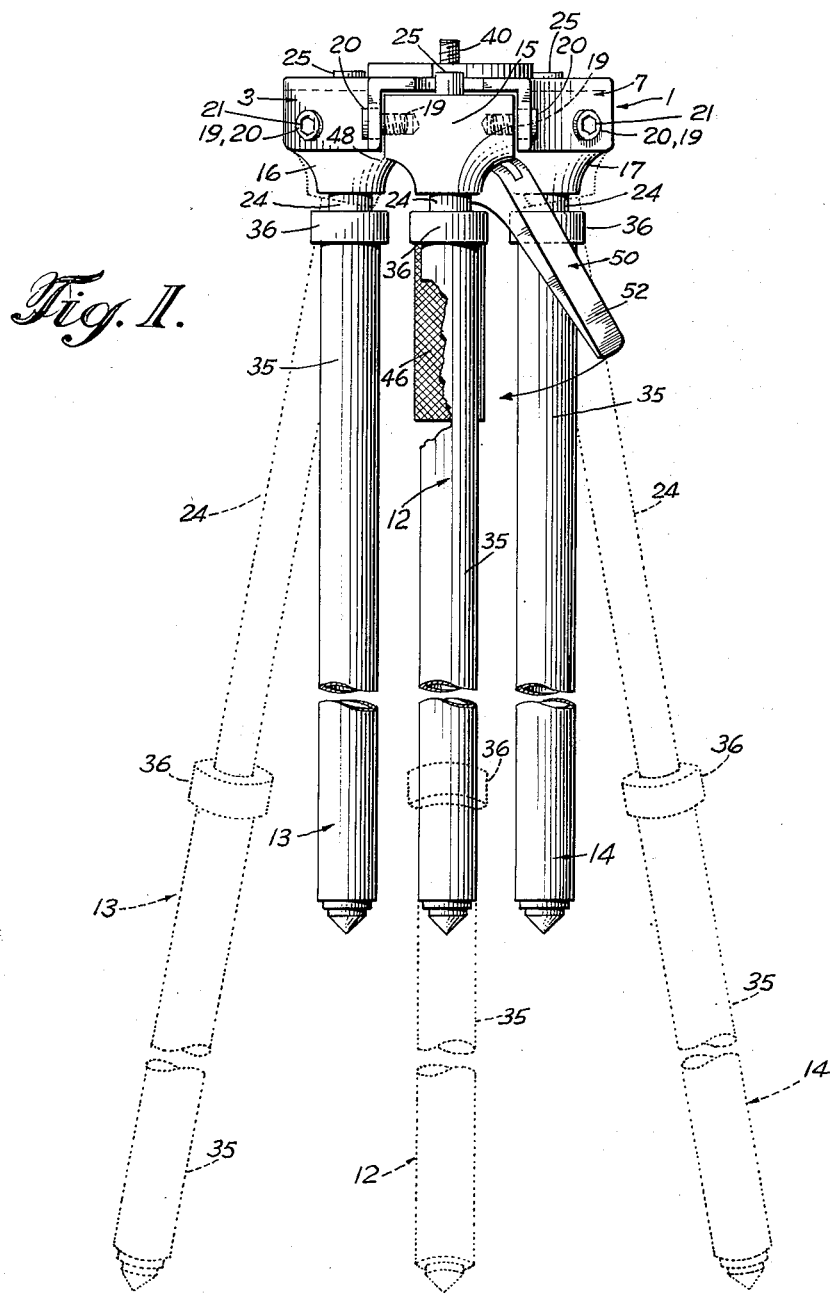
Fig. I.
INVENTOR.
Tom Nerman Feb. 26, 1952 — T. NERMAN — 2,587,511
TRIPOD
Filed July 22, 1949 — 2 SHEETS—SHEET 2

INVENTOR.
Tom Nerman
BY
Attorneys

Patented Feb. 26, 1952

2,587,511

UNITED STATES PATENT OFFICE 2,587,511

TRIPOD

Tom Nerman, New York, N. Y.

Application July 22, 1949, Serial No. 106,202

16 Claims. (Cl. 248—188)

The invention relates to a tripod for an optical instrument, such as a camera.

The general object of the invention is to provide a novel, simple, rugged and practical tripod for an optical instrument, and which comprises a head for supporting said instrument, said head having permanently attached legs, the tripod assembly comprising a single unit which is readily collapsible for carrying and packaging.

A special object of the invention is to provide a novel tripod for an optical instrument, said tripod having legs which are independently or jointly extensible so that in setting up a tripod for work the legs may be readily adjusted as to length so that the head of the tripod may be positioned horizontally or at any selected angle without respect to the irregularities of the ground.

Further, the invention contemplates a tripod, the legs of which are permanently and pivotally attached to the head and which normally depend in parallelism with each other from said head, and which may together be disposed outwardly with respect to said head and to each other for purposes of setting up the tripod.

A further object of the invention is to provide simple means whereby the normally parallel legs of the tripod may be expanded and locked in an expanded position independently of the lengths to which said legs are extended.

A further object of the invention is to provide in such a tripod simple means whereby the legs may be jointly extended so that all are of approximately equal length so that the tripod, as a whole, is of approximately the desired height in a particular setup, and cooperating means whereby each leg may be individually further extended or contracted, as needed, to cause the tripod to rest upon an irregular surface with the head thereof horizontally disposed and accurately positioned at the desired height above such surface.

The present invention is of particular utility and convenience to photographers, particularly in work out of doors, where the mounting surface for the tripod may be expected to be irregular, not only on account of the features for jointly and independently adjusting the lengths of the legs, but also because the tripod comprises a single unit, and no time need be lost in the field for screwing legs into the head and for separately adjusting the lengths of the several legs.

A further object of the invention is to provide a tripod which is of sturdy yet lightweight construction so that the camera is supported free of vibration when the tripod is being used and which is of such lightweight construction that the carrying of the same from place to place in a tour does not fatigue the photographer.

These and other advantages of the present invention will be more fully understood from the following description and from the drawing in which one embodiment of the invention is illustrated. It will be understood of course that a variety of modifications of the invention are possible within the scope of the claims.

In the drawing:

Fig. 1 is an elevational view of the tripod; in solid lines the tripod is shown in its normal collapsed and undistended condition; in dotted lines the tripod is shown with its legs expanded with respect to each other and extended to their maximum lengths.

Figures 2, 3, 4:
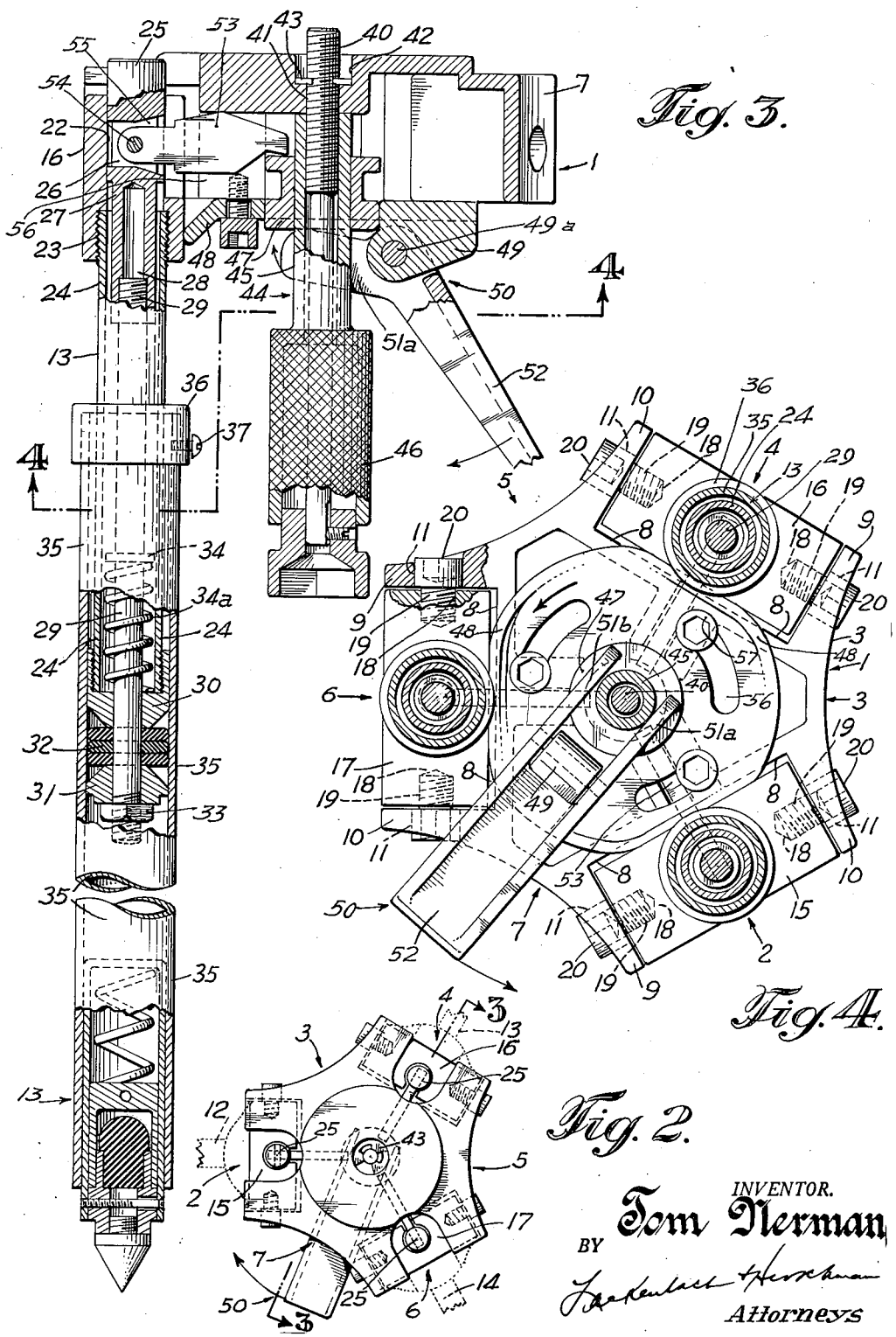
Fig. 2 is a top plan view of the tripod.
Fig. 3 is the section 3—3 of Fig. 2. The section, in elevation, is in part broken away to condense the figure.
Fig. 4 is the section 4—4 of Fig. 3, showing the upper members of the tripod from just beneath the head thereof.

The head 1 of the tripod is preferably a casting of aluminum, magnesium, or some other light metal, and is roughly of the shape of a hexagonal prism, as shown in Figs. 2 and 4. The sides of the prism are indexed in a seriatim 2, 3, 4, 5, 6, and 7, the even numbered sides being straight and the odd numbered sides being slightly concave. The underside of the head 1 is variously hollowed out as shown most clearly in Figs. 3 and 4.

Each straight side, i. e., each alternate one of the sides of the head, or sides 2, 4, and 6 thereof, are centrally slotted in like manner at 8. At the sides of the slot 8 of any straight side 2, 4, or 6, are thereby provided remaining lugs or brackets 9 and 10, the opposed surfaces of which are parallel and the outer surfaces are of course portions of the three slightly concave sides 3, 5, and 7 of the six-sided head 1. See Fig. 4. Each pair of brackets 9 and 10 is bored through in alignment to provide journals for the pivotal mount of one of the legs of the tripod. The bore of every bracket is indexed 11.

The three legs of the tripod are alike; however, for purposes of locating hereinafter certain other parts of the tripod, the legs are designated differently, thus: legs 12, 13, and 14 relate to straight side 2, 4, and 6, respectively of the head 1.

Each leg of the tripod is provided with an expanded head. The heads of the legs 12, 13, and 14 are respectively designated 15, 16, and 17. The outside of head 15 of leg 12 is seen in true elevation in Fig. 1. The head of each leg is provided with a tapped bore 18 on either side thereof; and a shouldered screw 19, having a smooth cylindrical head 20 (which may be provided with a screwdriver slot or a wrench seat 21, as shown in Fig. 1) is driven into said tapped bore 18, the head 20 of the screw being rotatably received in a bore 11 of one (9 or 10) of a pair of brackets provided on one of the straight sides of the head 1. See Fig. 4. Thus the heads 20 of the screws 19 serve as stub shafts for pivotally mounting the leg to the pair of brackets and the bores 11 of the pair of brackets serve as journals for the stub shafts. Thus any leg is mounted to the head 1 in such manner that its angular disposition thereto may be varied and so that the legs may be collapsed so as to be parallel as shown in solid lines in Fig. 1 or expanded as shown in dotted lines in the same figure.

As each leg is of similar construction that of leg 13, seen partly in axial section and partly erased in Fig. 3 (section 3—3 of Fig. 2), will be particularly discussed.

The head 16 of leg 13, like the head of any leg, is provided with a bore 22 coaxial with the leg itself, and the lower portion of the bore 22 is counterbored and tapped at 23. Each leg comprises a pair of tubes, one within the other, whereby the leg may be telescoped. The upper end of the inner tube 24 is externally threaded so as to engage the head of the leg at 23. See Fig. 3.

Inside the bore 22 of the head of the leg and also passing downward into the upper part of the leg itself is a member 25 which is a round rod having an upper portion of diameter nearly that of the bore 22 so that the portion 25 may fit freely and may slide therein. A slot 26 is provided in one side of portion 25, as shown in Fig. 3. The lower portion 27 of member 25 is of reduced diameter, adapted to fit into and to be reciprocated freely within the tube forming the inner tube 24. The lower portion 27 of member 25 is counterbored at 28 and is tapped. A rod 29, tapped at its upper and lower ends is driven coaxially into the tapped counterbore of the lower portion 27 of member 25.

The lower end of tube 24 is also externally threaded and a centrally perforate internally threaded plug 30 is screwed thereonto, the rod 29 passing freely through the central perforation of the plug. Mounted on the lower extremity of the rod 29 between the plug and a washer 31, preferably of metal, are a plurality of resilient washers 32; and the washer 31 is prevented from dropping from the end of rod 29 by means of a nut 33 screwed onto the lower threaded portion of the rod 29. A collar 34 is provided on the rod 29 somewhat above the plug 30, the collar being fixed to the rod in any suitable manner so that it cannot move axially with respect to the rod; and between collar 34 and the plug 30 is a compression spring 34a surrounding the rod 29.

The lower portion of any leg comprises an outer tube 35, the inside diameter of which is a trifle greater than the external diameter of the tube 24 forming the upper portion of any leg. The tube 35 is thus slidably mounted on the outside of tube 24. A cap 36 is provided on the upper end of tube 35, and is held in place by means of set screw 37. See Fig. 3. The cap 36 is provided with a central perforation large enough to permit free movement therewithin of tube 24, but not sufficiently large to permit passage of plug 30. Thus plug 30 operates, in connection with cap 36, as a means for limiting downward movement of tube 35 with respect to tube 24.

The expansion spring 34a normally tends to draw the washer 31 toward the plug 30 and to compress the resilient washers 32. Such tension of course results in expanding the outside diameter of the resilient washers 32 so that the peripheries thereof engage the tube 35 and prevent the same from freely sliding with respect to tube 24. In other words, when the resilient washers are expanded under compression, which is normal, the upper portion of the leg, i.e., tube 24, and the lower portion thereof, i. e., tube 35, cannot move relative to each other and the length of the leg remains fixed. However, when the member 25, the top of which is accessible at the top of the head, e. g., head 16 of the leg 13, Fig. 3, is depressed, as by the finger of the photographer, and space is provided within which the tube 35 may drop, the latter slides downwardly on tube 24 and so lengthens the leg. This operation may be had as of each leg independently.

A rod 40, the upper portion of which is threaded, is driven through a tapped bore 41 at the center of the head 1 of the tripod. That portion exposed on the top of the tripod head may serve as a mounting screw for a pan. Within a counterbore 42 in the upper portion of the tapped bore 41, is a jam nut 43. Mounted on rod 40 beneath head 1 is a member 44. The upper part 45 of member 44 is a smooth cylinder; the lower part 46 is a knurled cylinder of increased diameter and which may serve as a convenient handgrip.

Slidably mounted on the upper part 45 is a collar 47. Surrounding the collar 47 is a centrally perforate cam 48, more particularly described below. On the lower surface of a cam 48 is a lug 49 upon which is pivotally mounted at 49a a bellcrank 50 (see Fig. 3, wherein the lower portion of the outer arm of the bellcrank is partly erased to condense the drawing; and also Fig. 1). The inner arm of the bellcrank is bifurcated to form two like portions 51a and 51b (see the bottom plan sectional view of Fig. 4) which pass on either side of the upper part 45 and engage the bottom of collar 47. The two portions 51a and 51b of the inner arm of the bellcrank 50 operate for all practical purposes as a single bellcrank arm, both portions together engaging the lower surface of the collar 47. The outer arm of the bellcrank is designated 52 and is adapted to be used as a handle alone or in cooperation with the handgrip 46. See Fig. 3. The arrow in this figure indicates the direction of movement of the bellcrank for raising the collar 47. It will be obvious from the structure described that the bellcrank and cam may be rotated without interfering with the normal relationship between the handgrip 46, the collar 47, and the bellcrank 50 itself.

The cam 48 is best illustrated in Fig. 4 where it is shown in bottom plan. The cam 48 is provided with three arcuate slots 56, of which only one is indexed (see Fig. 4). Three cap screws 57, threaded into the head 1 prevent the cam 48 from escaping. It will be understood from Fig. 4 that the cam 48 may be rotated by means of the bellcrank 50. The cam 48 is a flanged circular plate having at 120° intervals flattened peripheral portions cut down to chords. The flattened sides of the cam 48 normally engage the heads 15, 16 and 17 of the legs 12, 13, and 14 respectively. It will be obvious from Fig. 4 that when the cam 48 is rotated to the extent permitted by the slots 56 and cap screws 57, the rotund portions of the cam engage the insides of the legs and thereby spread the latter.

Each leg is provided with a lever 53 the inner end of which normally rests upon the top of collar 47 and the outer end of which is pivotally mounted at 54 to member 25 within a slot 55 within said member. The head 1 itself operates as a fulcrum for lever 53. See Fig. 3. It will be obvious from this figure that when the collar 47 is raised all members 25 are depressed and the resilient disks 32 are permitted to contract, thereby releasing tube 35 so that the related leg may be extended.

Also it will be obvious that any member 25 may be independently depressed without respect either to the collar 47 and its governing bellcrank 50 or to the other members 25; thus any leg may be set and locked independently of the others.

I claim:

1. A tripod comprising a head; extensible legs pivotally mounted on said head and normally depending therefrom substantially in parallelism with each other; and a cam mounted on said head for rotation in a plane parallel to that of said head, said cam engaging said legs and spreading the same upon rotation of said cam.

2. A tripod comprising a head; legs pivotally mounted on said head and normally depending therefrom substantially in parallelism with each other; and a cam pivotally mounted on said head, said cam engaging said legs and spreading the same upon pivotal movement of said cam.

3. A tripod comprising a head; telescoping legs pivotally mounted on said head and normally depending therefrom substantially in parallelism with each other; a cam mounted on said head for rotation in a plane parallel to that of said head, said cam engaging said legs and spreading the same upon rotation of said cam; a bellcrank mounted on said cam for pivotal movement in a plane normal to that of said head, one arm of said bellcrank constituting a handle whereby said cam may be rotated and said bellcrank may be pivotally moved; locking means within each leg normally preventing telescoping thereof; and means actuated by said bellcrank for simultaneously releasing the locking means of all legs.

4. A tripod comprising a head; telescoping legs pivotally mounted on said head and normally depending therefrom substantially in parallelism with each other; a cam pivotally mounted on said head, said cam engaging said legs and spreading the same upon pivotal movement of said cam; a bellcrank mounted on said cam for pivotal movement, one arm of said bellcrank constituting a handle whereby both said cam and said bellcrank may be pivotally moved; locking means within each leg normally preventing telescoping thereof; and means actuated by said bellcrank for simultaneously releasing the locking means of all legs.

5. The combination of claim 3 including for each of said locking means a manually controllable element for unlocking the same whereby each of said locking means may be selectively unlocked without respect to said bellcrank.

6. The combination of claim 4 including for each of said locking means a manually controllable element for unlocking the same whereby each of said locking means may be selectively unlocked without respect to said bellcrank.

7. The combination of claim 3 wherein each leg comprises a smaller tube mounted within a larger tube, and wherein said locking means comprise diametrically expansible elements mounted on each of said smaller tubes.

8. The combination of claim 4 wherein each leg comprises a smaller tube mounted within a larger tube, and wherein said locking means comprise diametrically expansible elements mounted on each of said smaller tubes.

9. A tripod comprising a head; a mounting screw projecting upwardly from said head; telescoping legs pivotally mounted on said head and normally depending therefrom substantially in parallelism with each other; and a cam mounted on said head for rotation in a plane parallel to that of said head, said cam engaging said legs and spreading the same upon rotation of said cam.

10. A tripod comprising a head; a mounting screw projecting upwardly from said head; telescoping legs pivotally mounted on said head and normally depending therefrom substantially in parallelism with each other; a cam pivotally mounted on said head, said cam engaging said legs and spreading the same upon pivotal movement of said cam; locking means within each leg normally preventing telescoping thereof; and means mounted on said cam for simultaneously releasing the locking means of all legs.

11. The combination of claim 10 including for each of said locking means a manually controllable element for unlocking the same whereby each of said locking means may be selectively unlocked without respect to said cam.

12. The combination of claim 10 wherein each leg comprises a smaller tube mounted within a larger tube, and wherein said locking means comprise diametrically expansible elements mounted on each of said smaller tubes.

13. In apparatus of the class described, a head; a leg pivotally mounted on said head, said leg comprising a smaller tube mounted within a larger tube for sliding movement therein; and means for locking said smaller tube within said larger tube against such sliding movement, said means comprising a diametrically expansible element mounted on said smaller tube.

14. The combination of claim 13 including reciprocating means mounted within said smaller tube for expanding said element.

15. In apparatus of the class described, a head, legs pivotally mounted on said head, said legs each comprising a smaller tube mounted within a larger tube for sliding movement therein; means for locking each of said smaller tubes within one of said larger tubes, each of said means comprising a diametrically expansible element mounted on one of said smaller tubes; and a cam mounted on said head in engagement with said legs and spreading said legs when moved relatively thereto.

16. In apparatus of the class described, a head; a leg pivotally mounted on said head, said leg comprising a smaller tube mounted within a larger tube for sliding movement therein; a perforate plug mounted on one end of said smaller tube; a rod within said smaller tube and passed through the perforation of said plug; a spring mounted on said rod within said smaller tube and engaging said plug for urging said rod to move relatively to said perforation; and a resilient washer mounted on said rod outside said smaller tube, said washer being normally forced against said plug by said spring whereby said washer is diametrically expanded to engage said larger tube for preventing said sliding movement.

TOM NERMAN.

REFERENCES CITED

The following references are of record in the file of this patent:

UNITED STATES PATENTS

| Number | Name | Date |
|---|---|---|
| 2,467,567 | Price | Apr. 19, 1949 |
| 2,490,369 | Neuwirth | Dec. 6, 1949 |

FOREIGN PATENTS

| Number | Country | Date |
|---|---|---|
| 124,087 | Great Britain | of 1919 |